United States Patent [19]

Nakajima et al.

[11] Patent Number: 5,749,222
[45] Date of Patent: May 12, 1998

[54] CATALYST SOUNDNESS ASSESSMENT DEVICE

[75] Inventors: Yuki Nakajima, Yokosuka; Mikio Matsumoto, Yokohama, both of Japan

[73] Assignee: Nissan Motor Co., Ltd., Yokohama, Japan

[21] Appl. No.: 611,815

[22] Filed: Mar. 6, 1996

[30] Foreign Application Priority Data

Mar. 9, 1995 [JP] Japan ................... 7-049866

[51] Int. Cl.⁶ ........................................... F01N 3/20
[52] U.S. Cl. ........................... 60/274; 60/276; 60/277
[58] Field of Search .......................... 60/276, 277, 274

[56] References Cited

U.S. PATENT DOCUMENTS

| | | | |
|---|---|---|---|
| 5,088,281 | 2/1992 | Izutani et al. | 60/274 |
| 5,154,055 | 10/1992 | Nakane et al. | 60/277 |
| 5,214,915 | 6/1993 | Schneider et al. | 60/277 |
| 5,280,707 | 1/1994 | Nakashima et al. | 60/277 |
| 5,390,490 | 2/1995 | Brooks | 60/277 |
| 5,417,061 | 5/1995 | Maeda et al. | 60/277 |
| 5,448,886 | 9/1995 | Toyoda | 60/277 |

FOREIGN PATENT DOCUMENTS

| | | |
|---|---|---|
| 2-30915 | 2/1990 | Japan. |
| 5-106493 | 4/1993 | Japan. |
| 5-106494 | 4/1993 | Japan. |

*Primary Examiner*—Willis R. Wolfe
*Attorney, Agent, or Firm*—Foley & Lardner

[57] ABSTRACT

In an engine provided with a catalytic converter in an exhaust passage, the degree of deterioration of the catalyst in the converter is determined. Sensors detecting whether the air-fuel mixture supplied to the engine is rich or lean, are installed upstream and downstream of the converter, and an air-fuel ratio is feedback controlled based on the signal output from the upstream sensor. The soundness of the catalyst is assessed based on a difference between a change-over time of the upstream sensor and a change-over time of the downstream sensor, and a distinction is made between full catalyst deterioration and medium catalyst deterioration by introducing a dispersion value in the assessment process.

12 Claims, 7 Drawing Sheets

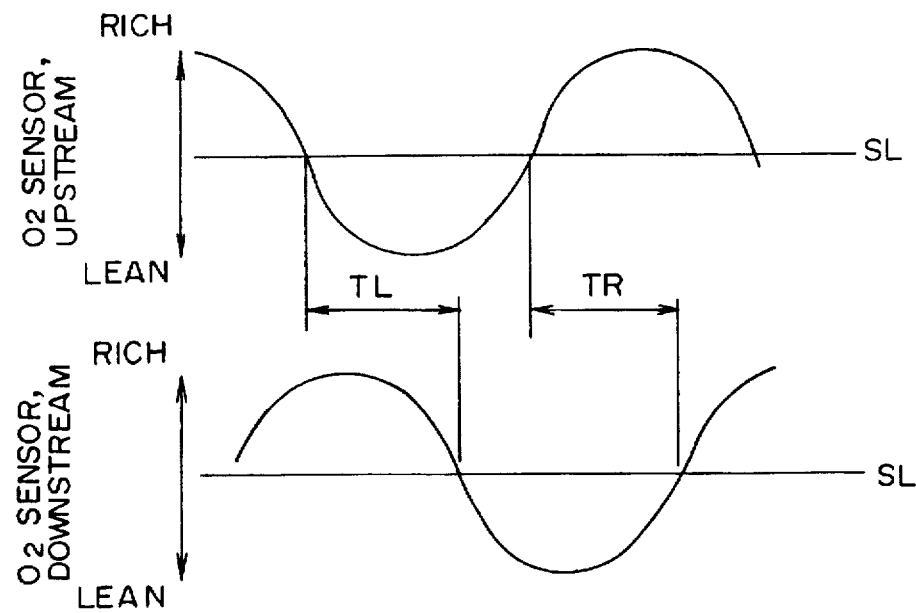
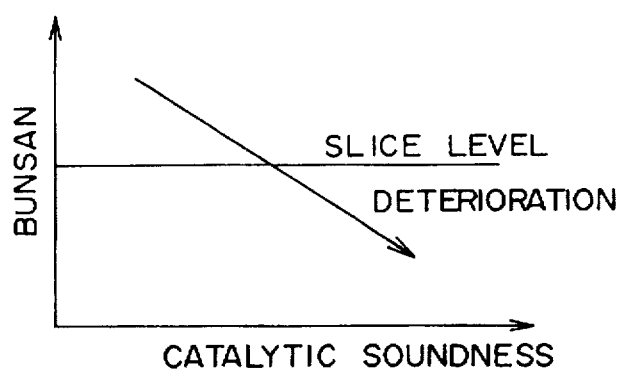

5,749,222

1

CATALYST SOUNDNESS ASSESSMENT DEVICE

FIELD OF THE INVENTION

This invention relates to assessing the soundness of a catalyst used for cleaning engine exhaust gas.

BACKGROUND OF THE INVENTION

A device comprising air-fuel ratio sensors installed respectively upstream and downstream of a catalytic converter in an automobile engine exhaust passage, in order to detect soundness of the catalyst by comparing the output signals of the two sensors, is disclosed in Tokkai Hei 2-30915 published by the Japanese Patent Office in 1990, and in Tokkai Hei 5-106493 and Tokkai Hei 5-106494 respectively published by the Japanese Patent Office in 1993. The air-fuel ratio sensor may for example be an oxygen sensor which reacts to the oxygen concentration of the exhaust gas.

In the aforesaid device known in the art, a fuel supply amount is feedback controlled based on the output of the upstream sensor such that the air-fuel ratio of the gas mixture supplied to the engine is a predetermined amount. This control is a quasi-proportional integral control, the result being that the output of the upstream sensor periodically alternates between rich and lean.

On the other hand, the variation of oxygen concentration downstream of the catalytic converter is more gradual due to the oxygen storing function of the catalyst in the converter. The output of the downstream sensor therefore has a smaller variation amplitude and a longer fluctuation period than that of the upstream sensor.

When the catalyst deteriorates, the oxygen storing function of the catalyst declines so that there is no longer much difference between the upstream and downstream oxygen concentrations in the converter. In this case, the output of the downstream sensor alternates between rich and lean with the same period as that of the upstream sensor and the amplitude of the fluctuation also increases.

In the aforesaid assessing device, a response delay time TL from when the output of the upstream sensor changes from rich to lean to when the output of the downstream sensor changes from rich to lean, and a response delay time TR from when the output of the upstream sensor changes from lean to rich to when the output of the downstream sensor changes from lean to rich, are measured. When TL is less than or equal to a slice level, when TR is less than or equal to a slice level, or when the average value of TR and TL is less than or equal to a slice level, it is determined that the catalyst has deteriorated.

The inventors sampled TL and TR when the median value of the air-fuel ratio, and the period and amplitude of fluctuation of the air fuel ratio, were varied using a catalyst which still had a slight catalytic activity (referred to hereinafter as a medium deteriorated catalyst) and a catalyst which had no further catalytic activity (referred to hereinafter as a fully deteriorated catalyst).

According to the results, as shown in FIG. 9A, in the case of a fully deteriorated catalyst where there is no further catalytic activity, even when there is a slight variation in the period and amplitude of the air-fuel ratio fluctuation, there is almost no variation in the position of plotted points, i.e. TL and TR are constant as shown in FIG. 9A.

In the case of a medium deteriorated catalyst when some catalytic activity is left, the positions of plotted points are

2 scattered. Expressing these positions in the form of an equation, the relation TL+TR=constant holds as shown in FIG. 9B, or the relation TL×TR=constant holds as shown in FIG. 9(C).

In FIG. 9A, the center of the plotted points for a medium deteriorated catalyst effectively overlaps the plotted points for a fully deteriorated catalyst. In such case, the average value of TL, the average value of TR, the sum of TL and TR, and the average value of the sum of TL and TR, are the same for a fully deteriorated catalyst and for a medium deteriorated catalyst. In other words, this kind of assessment device cannot distinguish between a fully deteriorated catalyst and a medium deteriorated catalyst, and for example there is insufficient data to determine whether or not the catalyst should be replaced.

SUMMARY OF THE INVENTION

It is therefore an object of this invention to precisely determine the extent of deterioration of a catalyst.

It is a further object of this invention to precisely determine whether or not it is necessary to replace a catalyst due to deterioration.

In order to achieve the above objects, this invention provides a catalyst soundness assessment device for an engine that has an exhaust passage and a catalytic converter interposed in the exhaust passage in order to clean exhaust gas in the passage using a catalyst. The device comprises an upstream air-fuel ratio sensor for outputting a signal indicative of whether air-fuel mixture supplied to the engine is lean or rich relative to a predetermined value from the exhaust gas in said passage upstream of said converter, a downstream air-fuel ratio sensor for outputting a signal indicative of whether the air-fuel mixture supplied to the engine is lean or rich relative to the predetermined value from the exhaust gas in the passage downstream of said converter, and a mechanism for feedback controlling an air-fuel ratio of the air-fuel mixture supplied to the engine based on the signal output from the upstream air-fuel ratio sensor.

According to an aspect of this invention, the device further comprises a mechanism for measuring a response delay time from when the signal output from the upstream air-fuel ratio sensor changes over to when the signal output from the downstream air-fuel ratio sensor changes over, a mechanism for calculating a dispersion value of a corresponding value based on the response delay time, and a mechanism for determining that the catalyst has deteriorated when the dispersion value is equal to or less than a predetermined value.

According to another aspect of this invention, the device further comprises a first measuring mechanism for measuring a lean response delay time from when the signal output from the upstream air-fuel ratio sensor changes over from rich to lean, to when the signal output from the downstream air-fuel ratio sensor changes over from rich to lean, a second measuring mechanism for measuring a rich response delay time from when the signal output from the upstream air-fuel ratio sensor changes over from lean to rich, to when the signal output from the downstream air-fuel ratio sensor changes over from lean to rich, a mechanism for calculating a dispersion value of a difference between the lean response delay time and the rich response delay time, and a mechanism for determining that the catalyst has deteriorated when the dispersion value is equal to or less than a predetermined value.

According to yet another aspect of this invention, the device further comprises a mechanism for measuring a lean response delay time from when the signal output from the upstream air-fuel ratio sensor changes over from rich to lean, to when the signal output from the downstream air-fuel ratio sensor changes over from rich to lean, a mechanism fop calculating a dispersion value of the lean response delay time, and a mechanism for determining that the catalyst has deteriorated when the dispersion value is equal to or less than a predetermined value.

According to yet another aspect of this invention, the device further comprises a mechanism for measuring a rich response delay time from when the signal output from the upstream air-fuel ratio sensor changes over to when the signal output from the downstream air-fuel ratio sensor changes over, a mechanism for calculating a dispersion value of the rich response delay time, and a mechanism for determining that the catalyst has deteriorated when the dispersion value is equal to or less than a predetermined value.

According to yet another aspect of this invention, the device further comprises a first measuring mechanism for measuring a lean response delay time from when the signal output from the upstream air-fuel ratio sensor changes over from rich to lean, to when the signal output from the downstream air-fuel ratio sensor changes over from rich to lean, a second measuring mechanism for measuring a rich response delay time from when the signal output from the upstream air-fuel ratio sensor changes over from lean to rich, to when the signal output from the downstream air-fuel ratio sensor changes over from lean to rich, a mechanism for calculating a dispersion value of a ratio of the lean response delay time to the rich response delay time, and a mechanism for determining that the catalyst has deteriorated when the dispersion value is equal to or less than a predetermined value.

The details as well as other features and advantages of this invention are set forth in the remainder of the specification and are shown in the accompanying drawings.

BRIEF DESCRIPTION OF THE DRAWINGS

FIGS. 7A and 7B are diagrams describing response delay times TL and TR according to this invention.

FIG. 8 is a diagram showing a relation between a dispersion amount BUNSAN and catalytic soundness according to this invention.

DESCRIPTION OF THE PREFERRED EMBODIMENTS

Figure 1:
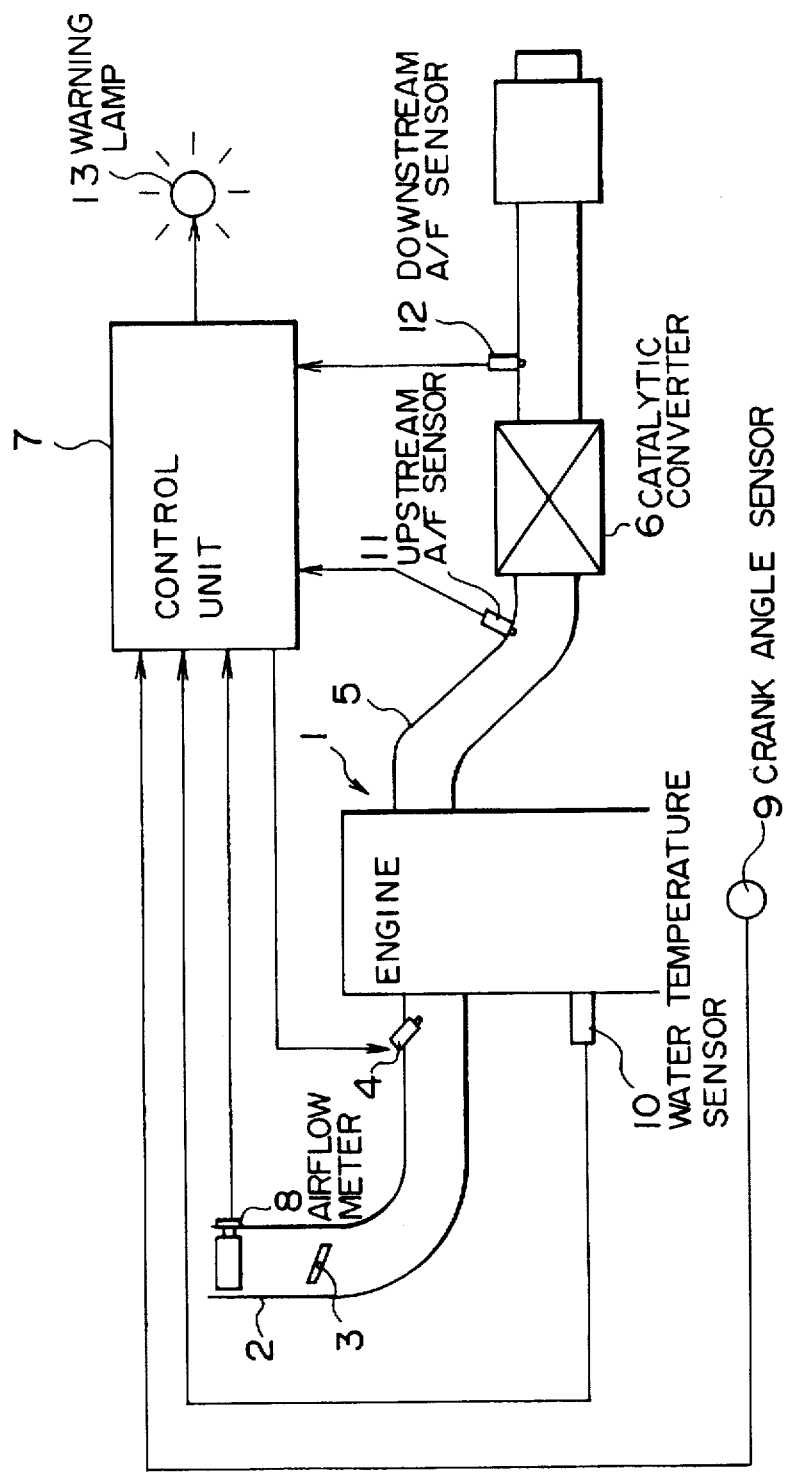
FIG. 1 is a schematic diagram of a soundness assessment device according to this invention.

Referring to FIG. 1 of the drawings, a multi-cylinder type water-cooled automobile engine 1 is provided with a throttle valve 3 in a common intake passage 2. The intake passage 2 branches off to each cylinder downstream of the valve 3, each branch pipe being provided with a fuel injection valve 4 which injects fuel toward the air intake port of each cylinder.

The engine 1 comprises an exhaust passage 5 for discharging burnt gas from each cylinder, and a catalytic converter 6 midway in the exhaust passage 5. The catalytic converter 6 may for example be a converter which purifies exhaust gas using a three-way catalyst.

The fuel injection valve 4 is an electromagnetic valve that opens and closes according to a pulse signal input from a control unit 7. The fuel injection amount from the valve 4 corresponds to the width of the pulse signal. The air-fuel ratio of the air-fuel mixture supplied to the engine 1 is controlled via the fuel injection amount.

To control fuel injection, signals are input to the control unit 7 from an air flow meter 8, crank angle sensor 9, water temperature sensor 10, upstream air-fuel ratio sensor 11 and downstream air-fuel ratio sensor 12.

The air flow meter 8 detects an intake air flow amount Qa from the resistance value of a heating wire exposed upstream of the throttle valve 3 of the air intake passage 2.

The crank angle sensor 9 outputs a reference crank angle signal each time a crankshaft makes one revolution, and outputs a unit crank angle signal each time the crankshaft rotates through a predetermined angle.

The water temperature sensor 10 detects a cooling water temperature Tw of the engine 1.

The upstream air-fuel ratio sensor 11 is installed in the exhaust passage 5 upstream of the catalytic converter 6, and the downstream air-fuel ratio sensor 12 is installed in the exhaust passage 5 downstream of the catalytic converter 6. These sensors 11 and 12 are oxygen sensors which generate an electromotive force according to a residual oxygen concentration of the exhaust gas, this force varying sharply around the theoretical air-fuel ratio as a turning point. The sensors 11 and 12 therefore output a high level voltage signal of approximately 1V on the rich side, and a low level voltage signal of approximately 100 mV on the lean side, of the theoretical air-fuel ratio.

The control unit 7 may for example comprise a CPU, a memory and an I/O interface. Based on these input signals, the control unit 7 controls the fuel injection amount of the fuel injection valve 4 and assesses the deterioration of the catalyst of the catalytic converter 6. When the deterioration of the catalyst exceeds a predetermined slice level, a warning lamp 13 lights.

Figure 2:
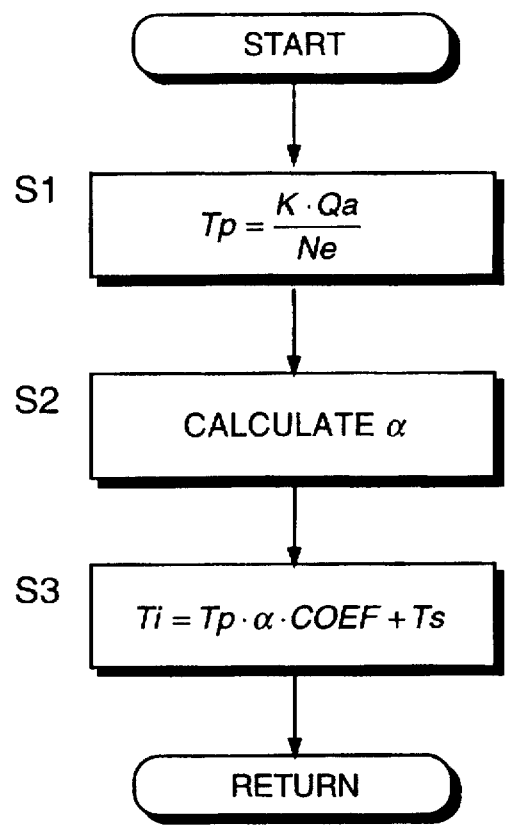
FIG. 2 is a flowchart describing a process of computing a fuel injection amount according to this invention.

The control unit 7 controls the air-fuel ratio according to the flowchart of FIG. 2. In a step S1, a basic fuel injection amount Tp corresponding to the theoretical air-fuel ratio at the intake air flow amount Qa is calculated from the intake air flow amount Qa detected according to the input signal from the air flow meter 8 and an engine speed Ne calculated according to the input signal from the crank angle sensor 9, as follows.

$$Tp = \frac{K \cdot Qa}{Ne}$$

where, K is a constant.

In a step S2, an air-fuel ratio feedback coefficient α is calculated based on the output of the upstream air-fuel ratio sensor 11. In other words, the output of the sensor 11 is compared to a predetermined slice level corresponding to the theoretical air-fuel ratio, and the air-fuel ratio feedback coefficient α is found from a quasi proportional integral control based on the variation of the sensor output to lean or rich.

In a step S3, the basic fuel injection amount Tp is corrected by the correction coefficient α by the following equation in order to calculate a fuel injection amount Ti.

$$Ti = Tp \cdot \alpha \cdot COEF + Ts$$

Herein, COEF represents various increase correction coefficients, e.g. a water temperature increase correction depending on the water temperature Tw and a correction for high speed and high load. Ts is a correction value for compensating an ineffectual injection time of the fuel injection valve 4, this value being added depending on the battery voltage which drives the valve 4.

When the fuel injection time Ti is calculated, an output resistor provided in the control unit 7 is set. A pulse signal having the pulse width Ti is then output to the fuel injection valve 4 with a predetermined timing in synchronism with the engine rotation, and the fuel injection valve 4 performs fuel injection according to this pulse signal.

Figures 3A, 3B:
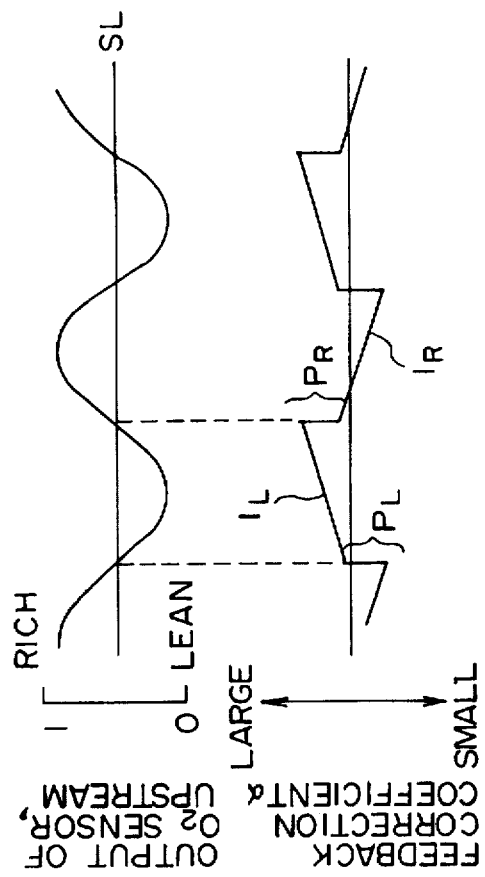
FIG. 3A and 3B are diagrams showing a relation between an upstream air-fuel ratio sensor output and air-fuel ratio feedback correction coefficient α according to this invention.

FIG. 3A shows an example of the output signal from the upstream air-fuel ratio sensor 11, and FIG. 3B shows the variation of the corresponding air-fuel ratio feedback coefficient α.

As the air-fuel ratio feedback correction coefficient α is calculated by the aforesaid quasi proportional integral control, when the output signal from the upstream air-fuel ratio sensor 11 intersects the slice level SL and there is a change-over from rich to lean, a proportional amount $P_L$ is added to the air-fuel ratio feedback coefficient α, and an integral constant $I_L$ is added on each subsequent further occasion.

As the air-fuel ratio feedback correction coefficient α is multiplied by the basic fuel injection amount Tp, due to this control, the air-fuel ratio gradually changes to rich. When the output of the upstream air-fuel ratio sensor 11 intersects the slice level SL and there is a change-over from lean to rich, a proportional amount $P_R$ is then subtracted from the air-fuel ratio feedback coefficient α, and an integral constant $I_R$ is subtracted on each subsequent occasion so that the air-fuel ratio gradually changes to lean.

This control is repeated so that the real air-fuel ratio continuously varies with a frequency of 1–2Hz and is maintained in the vicinity of the theoretical air-fuel ratio.

In this air-fuel ratio feedback control, the output of the downstream air-fuel ratio sensor 12 is used for correcting the proportional amounts $P_L$ and $P_R$.

However, when the fuel amount has to be increased at low water temperature or under high speed, high load conditions, or during a fuel cut when the vehicle is decelerating, the air-fuel ratio feedback correction coefficient α is clamped at 1 and open loop control is effectively performed.

The assessing of catalyst deterioration by the control unit 7 is performed during the aforesaid air-fuel ratio feedback control. This catalyst assessment process will now be described with reference to FIGS. 4–7.

Figure 4:
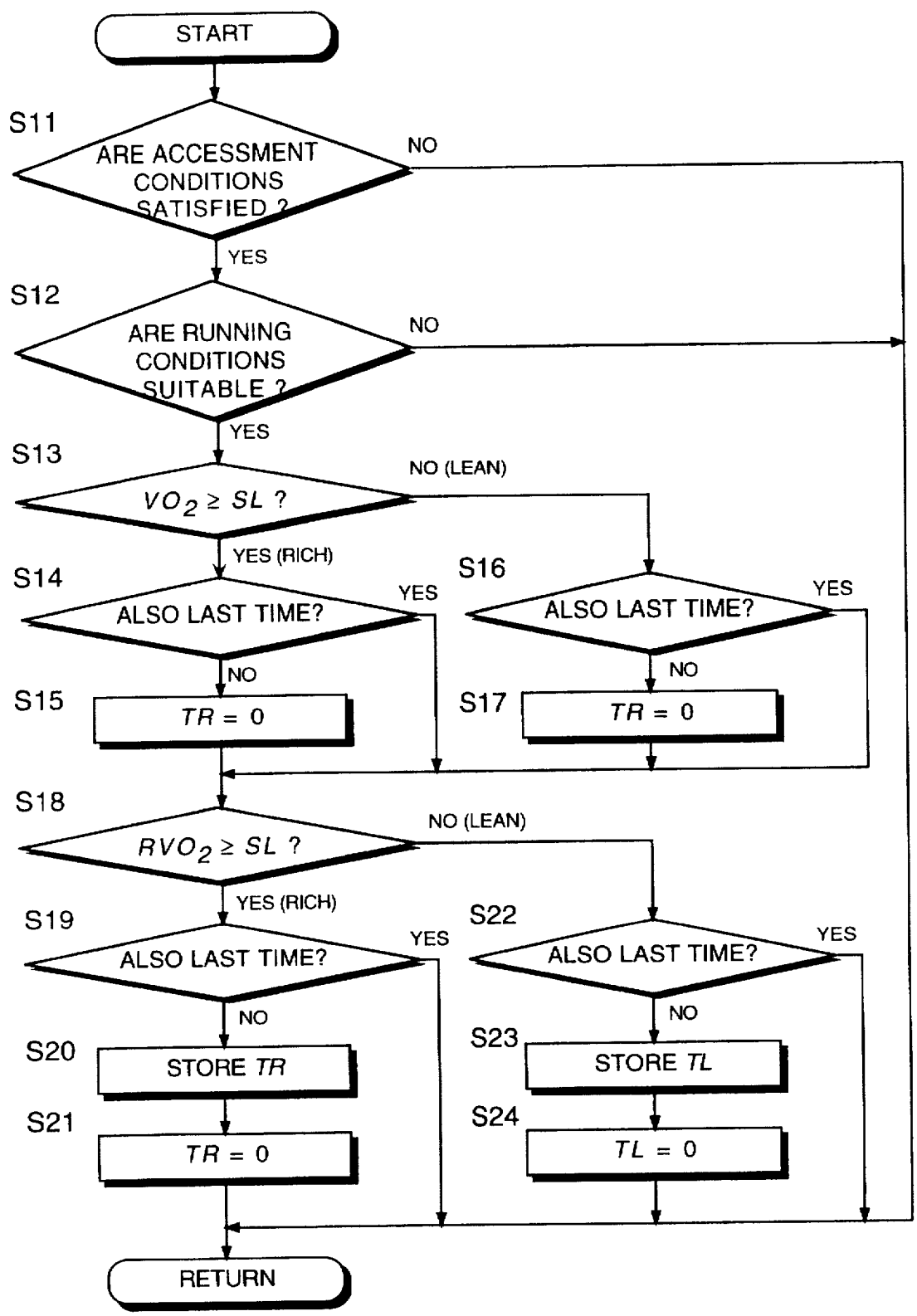
FIG. 4 is a flowchart describing a response delay time computation process according to this invention.

FIG. 4 is a response delay time measuring routine. According to this routine, in a step S11, it is determined whether or not certain assessment conditions are satisfied, as follows.

i) Was the water temperature equal to or above a predetermined level when the engine started up?

ii) Did a predetermined time elapse after engine warm-up was completed?

iii) Are the upstream air-fuel ratio sensor 11 and downstream air-fuel ratio sensor 12 active?

iv) Is the ratio of the change-over period of the output of the upstream air-fuel ratio sensor 11 to the change-over period of the output of the downstream air-fuel ratio sensor 12, equal to or less than a predetermined value?

The routine proceeds only to a step S12 when all these conditions are satisfied.

When condition iv) is satisfied, it indicates that the output variation of the upstream sensor 11 and the output variation of the downstream sensor 12 are effectively synchronized, which shows that the catalyst has deteriorated to some extent. In other words, the following catalyst soundness assessment is performed only when catalyst deterioration has progressed to a certain degree. This is because the purpose of the assessment is to distinguish between the case when the catalyst is fully deteriorated which requires a catalyst replacement, and the case where it is not yet fully deteriorated, so it does not require replacement.

In a step S12, it is determined whether or not the vehicle running conditions are suitable for performing a catalyst assessment. These conditions are as follows.

i) Is the vehicle speed within a predetermined range?

ii) Is the engine speed within a predetermined range?

iii) Is the engine load represented by the basic fuel injection amount Tp within a predetermined range?

iv) Are the variations of vehicle speed, engine speed and engine load within predetermined ranges?

The routine proceeds to a step S13 only when all these four conditions are satisfied.

In the step S13, an output signal $VO_2$ from the upstream air-fuel ratio sensor 11 is compared with the slice level SL. When $VO_2$ >SL, i.e. when the air-fuel ratio is rich, the routine proceeds to a step S14. In the step S14, it is determined whether or not the determination result on the immediately preceding occasion was rich.

If the determination result on the immediately preceding occasion was not rich, this indicates that the air-fuel ratio has changed over from lean to rich, so a timer value TR is reset in a step S15.

Similarly when $VO_2$ <SL, i.e. when the air-fuel ratio is lean, the routine proceeds to a step S16, and it is determined whether or not the determination result on the immediately preceding occasion was lean.

If the determination result on the immediately preceding occasion was not lean, this indicates that the air-fuel ratio has changed over from rich to lean, and a timer value TL is reset in a step S17.

Figure 5:
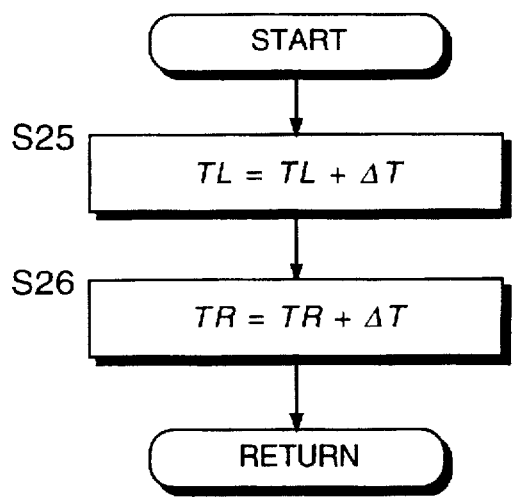
FIG. 5 is a flowchart describing a time counting process according to this invention.

In a time counting routine shown in FIG. 5, a predetermined time ΔT is added to the timer values TL and TR after reset each time a time ΔT elapsed so as to provide a timer function.

In a step S18, an output $RVO_2$ of the downstream air-fuel ratio sensor 12 is compared with the slice level SL.

When $RVO_2$ >SL, i.e. when the air-fuel ratio is rich, it is determined in a step S19 whether or not the determination result on the immediately preceding occasion was rich.

If the determination result on the immediately preceding occasion was not rich, this indicates that the air-fuel ratio has changed over from lean to rich. The timer value TR at this time is the time from when the output of the upstream sensor 11 changes over from lean to rich (step S15), to the time when the output of the downstream sensor 12 changes over from lean to rich, i.e. it is a rich response delay time. The timer value TR at this time is then stored in the memory of the control unit 7 in a step S20, and the timer value TR is reset in a step S21.

Similarly when $RVO_2$ <SL, i.e. when the air-fuel ratio is lean, it is determined in a step S22 whether or not the determination result on the immediately preceding occasion was lean.

If the determination result on the immediately preceding occasion was not lean, this indicates that the air-fuel ratio has changed over from rich to lean. The timer value TL at this time is the time from when the output of the upstream sensor 11 changes over from rich to lean (step S17), to the time when the output of the downstream sensor 12 changes over from rich to lean, i.e. it is a lean response delay time. The timer value TL at this time is then stored in the memory of the control unit 7 in a step S23, and the timer value TL is reset in a step S24.

In this way, the lean response delay time TL and rich response delay time TR are stored in the memory. Sufficient memory is reserved to store a predetermined number of the latest values of TL and TR respectively.

In the aforesaid routine, when the output of the upstream sensor 11 and that of the downstream sensor 12 are out of synchronization by one period or more, the measurement is not performed. The catalyst assessment, however, is performed only when the outputs of the sensors 11 and 12 are effectively synchronized as specified by the assessment conditions of the step S11, hence the two outputs are never out of synchronization by one period or more and no problem actually arises in practice with the assessment algorithm.

The steps S13, 16, 17, 18, 22 and 23 correspond to first measurement means, and the steps S13, 14, 15, 18, 19 and 20 correspond to second measurement means.

Figure 6:
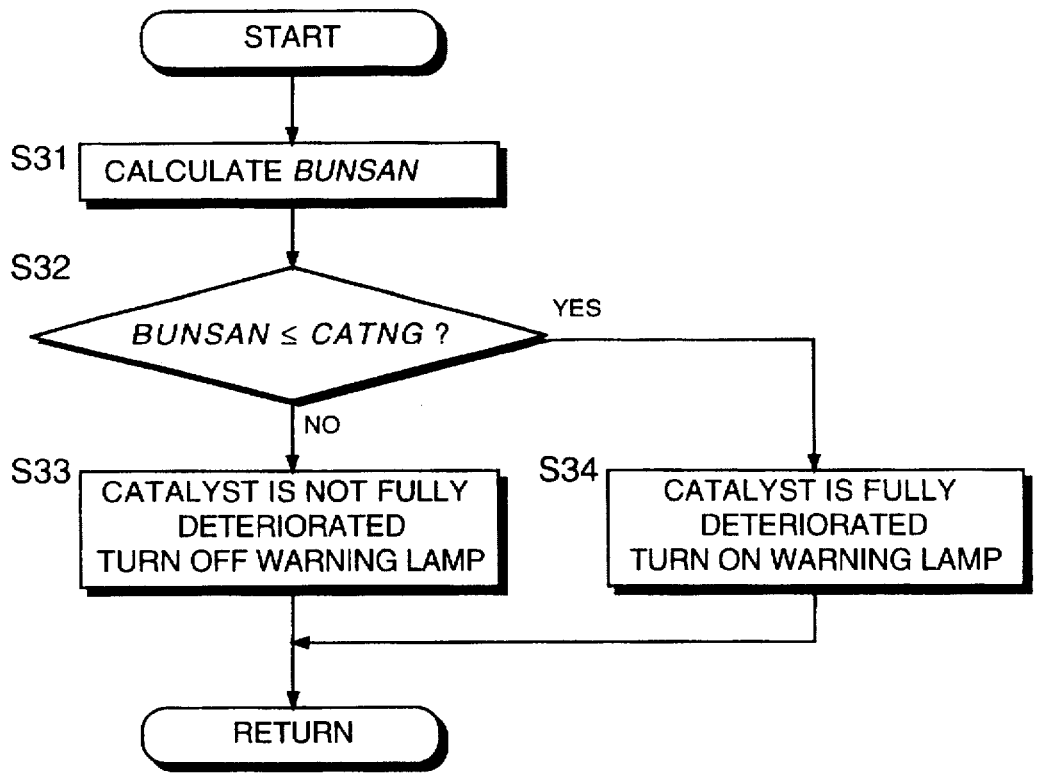
FIG. 6 is a flowchart describing a catalyst soundness determining process according to this invention.
Figure 9A:
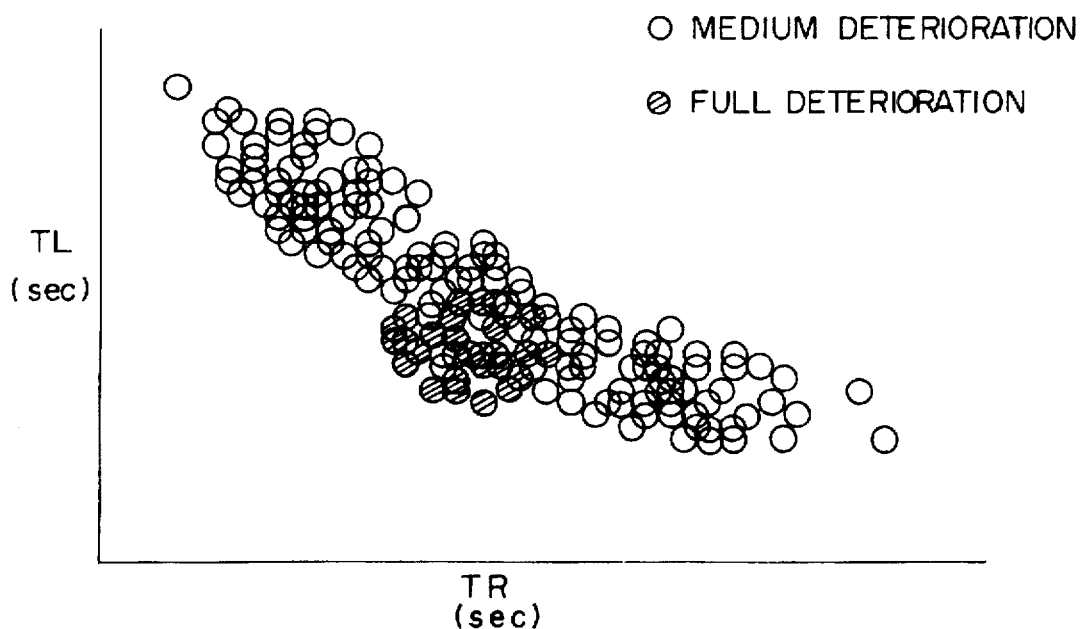
FIGS. 9A, 9B and 9C are diagrams respectively showing a relation between lean response delay time and rich response delay time in a different situation, according to this invention.
Figure 9B:
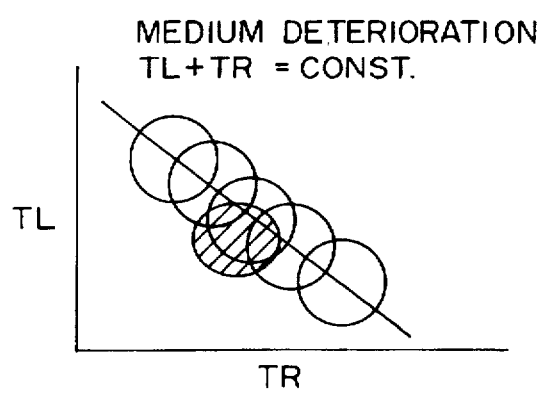
Figure 9C:
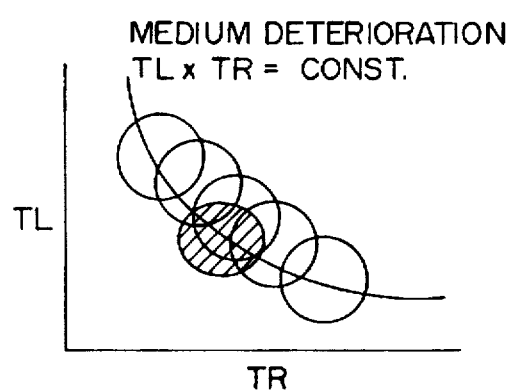

FIG. 6 shows the catalyst deterioration assessment routine. Herein, a dispersion value BUNSAN of a difference X between the lean response delay time TL and rich response delay time X=TL-TR (or TR-TL) is calculated by the following equation in a step S31.

$$BUNSAN = \frac{\Sigma (X - X_{AVE})^2}{n}$$

where, n is an integer and $X_{AVE}$ is the average value of X.

In a step S32, the computed BUNSAN is compared with a predetermined value CATNG, and it is determined whether or not BUNSAN≦CATNG.

When BUNSAN≦CATNG, the catalyst is fully deteriorated, and a warning lamp lights in a step S34. When BUNSAN>CATNG, the catalyst is medium deteriorated, and the warning lamp does not light in a step S33. It is therefore possible to distinguish between medium catalyst deterioration and full catalyst deterioration, and to precisely determine whether or not it is necessary to replace the catalyst.

The step S31 corresponds to dispersion value computing means, and the steps S32-34 correspond to catalyst deterioration assessment means.

According to this embodiment, the dispersion value of the difference between response delay times X=TL-TR (or TR-TL) in the step S31 is taken as BUNSAN, however the dispersion value of either one of the response delay times, i.e. X=TL or X=TR, may be taken as BUNSAN.

Further, the dispersion value of the ratio of the lean response delay time TL to the rich response delay time TR, i.e. X=TL/TR or X=TR/TL, may also be used as BUNSAN.

Accordingly, although the present invention has been shown and described in terms of the preferred embodiments thereof, it is not to be considered as limited by any of the perhaps quite fortuitous details of said embodiments, or the drawings, but only by the terms of the appended claims, which follow.

We claim:

1. A catalyst soundness assessment device for an engine, said engine being connected to an exhaust passage, and a catalytic converter using a catalyst being interposed in said exhaust passage for cleaning exhaust gas in said exhaust passage said catalyst soundness assessment device comprising:

an upstream air-fuel ratio sensor for outputting a signal indicative of whether an air-fuel mixture supplied to said engine is lean or rich relative to a predetermined value, said upstream air-fuel ratio sensor sensing the exhaust gas in said exhaust passage upstream of said converter;

a downstream air-fuel ratio sensor for outputting a signal indicative of whether the air-fuel mixture supplied to said engine is lean or rich relative to the predetermined value, said downstream air-fuel ratio sensor sensing the exhaust gas in said exhaust passage downstream of said converter;

a feedback controller for controlling an air-fuel ratio of the air-fuel mixture supplied to said engine based on the signal output from said upstream air-fuel ratio sensor;

a timing mechanism for measuring a response delay time from when the signal output from said upstream air-fuel ratio sensor changes overt to when the signal output from said downstream air-fuel ratio sensor changes over;

a calculator for calculating a dispersion value of a corresponding value based on said response delay time; and an analyzer for determining that said catalyst has deteriorated when said dispersion value is equal to or less than a predetermined value.

2. The catalyst soundness assessment device as defined in claim 1, wherein said timing mechanism comprises:

a first timer for measuring a lean response delay time from when the signal output from said upstream air-fuel ratio sensor changes over from rich to lean, to when the signal output from said downstream air-fuel ratio sensor changes over from rich to lean, and a second timer for measuring a rich response delay time from when the signal output from said upstream air-fuel ratio sensor changes over from lean to rich, to when the signal output from said downstream air-fuel ratio sensor changes over from lean to rich, wherein said calculator calculates the dispersion value based on a difference between said lean response delay time and said rich response delay time.

3. The catalyst soundness assessment device as defined in claim 1, wherein said timing mechanism measures a lean response delay time from when the signal output from said up stream air-fuel ratio sensor changes over from rich to lean, to when the signal output from said downstream air-fuel ratio sensor changes over from rich to lean, and wherein said calculator calculates the dispersion value based on said lean response delay time.

4. The catalyst soundness assessment device as defined in claim 1, wherein said timing mechanism measures a rich response delay time from when the signal output from said upstream air-fuel ratio sensor changes over, to when the signal output from said downstream air-fuel ratio sensor changes over, and wherein said calculator calculates the dispersion value based on said rich response delay time.

5. The catalyst soundness assessment device as defined in claim 1, wherein said timing mechanism comprises:

a first timer for measuring a lean response delay time from when the signal output from said upstream air-fuel ratio sensor changes over from rich to lean, to when the signal output from said downstream air-fuel ratio sensor changes over from rich to lean, and a second timer for measuring a rich response delay time from when the signal output from said upstream air-fuel ratio sensor changes over from lean to rich, to when the signal output from said downstream air-fuel ratio sensor changes over from lean to rich, wherein said calculator calculates the dispersion value based on a ratio of said lean response delay time to said rich response delay time.

6. A catalyst soundness assessment device for an engine, said engine being connected to an exhaust passage, and a catalytic converter using a catalyst being interposed in said exhaust passage to clean exhaust gas in said exhaust passage, said catalyst soundness assessment device comprising:

an upstream air-fuel ratio sensor for outputting a signal indicative of whether an air-fuel mixture supplied to said engine is lean or rich relative to a predetermined value, said upstream air-fuel ratio sensor sensing the exhaust gas in said exhaust passage upstream of said converter;

a downstream air-fuel ratio sensor for outputting a signal indicative of whether the air-fuel mixture supplied to said engine is lean or rich relative to the predetermined value, said downstream air-fuel ratio sensor sensing the exhaust gas in said exhaust passage downstream of said converter; and a microprocessor for:

feedback controlling an air-fuel ratio of the air-fuel mixture supplied to said engine based on the signal output from said upstream air-fuel ratio sensor;

measuring a response delay time from when the signal output from said upstream air-fuel ratio sensor changes over, to when the signal output from said downstream air-fuel ratio sensor changes over;

calculating a dispersion value of a corresponding value based on said response delay time; and determining that said catalyst has deteriorated when said dispersion value is equal to or less than a predetermined value.

7. The catalyst soundness assessment device as defined in claim 6, said microprocessor further:

measuring a lean response delay time from when the signal output from said upstream air-fuel ratio sensor changes over from rich to lean, to when the signal output from said downstream air-fuel ratio sensor changes over from rich to lean;

measuring a rich response delay time from when the signal output from said upstream air-fuel ratio sensor changes over from lean to rich, to when the signal output from said downstream air-fuel ratio sensor changes over from lean to rich; and calculating the dispersion value based on a difference between said lean response delay time and said rich response delay time.

8. The catalyst soundness assessment device as defined in claim 6, said microprocessor further:

measuring a lean response delay time from when the signal output from said upstream air-fuel ratio sensor changes over from rich to lean, to when the signal output from said downstream air-fuel ratio sensor changes over from rich to lean; and calculating the dispersion value based on said lean response delay time.

9. The catalyst soundness assessment device as defined in claim 6, said microprocessor further:

measuring a rich response delay time from when the signal output from said upstream air-fuel ratio sensor changes over to when the signal output from said downstream air-fuel ratio sensor changes over; and calculating the dispersion value based on said rich response delay time.

10. The catalyst soundness assessment device as defined in claim 6, said microprocessor further:

measuring a lean response delay time from when the signal output from said upstream air-fuel ratio sensor changes over from rich to lean, to when the signal output from said downstream air-fuel ratio sensor changes over from rich to lean;

measuring a rich response delay time from when the signal output from said upstream air-fuel ratio sensor changes over from rich to lean, to when the signal output from said downstream air-fuel ratio sensor changes over from lean to rich; and calculating the dispersion value based on a ratio of said lean response delay time to said rich response delay time.

11. A catalyst soundness assessment device as for an engine, said engine being connected to an exhaust passage, and a catalytic converter using a catalyst being interposed in said exhaust passage to clean exhaust gas in said exhaust passage, said catalyst soundness assessment device comprising:

an upstream air-fuel ratio sensor disposed in the exhaust passage upstream of said converter for detecting whether an air-fuel mixture supplied to said engine is lean or rich relative to a predetermined value;

a downstream air-fuel ratio sensor disposed in the exhaust passage downstream of said converter for detecting whether the air-fuel mixture supplied to said engine is lean or rich relative to the predetermined value;

a memory; and a processor unit for:

controlling the air-fuel ratio of the air-fuel ratio sensor;

measuring a response delay time from when the signal output from the upstream air-fuel ratio sensor changes over, to when the signal output from the downstream air-fuel ratio sensor changes over;

storing a plurality of the measured response delay times in the memory;

calculating a dispersion value using the response delay times stored in the memory; and determining that said catalyst has deteriorated when the dispersion value is equal to or less than a predetermined value.

12. A method for assessing the soundness of a catalyst in a catalytic converter interposed in an exhaust passage connected to an internal combustion engine, to clean exhaust gas in said exhaust passage, said method comprising:

outputting a first signal indicative of whether an air-fuel mixture supplied to said engine is lean or rich relative to a predetermined value by sensing the exhaust gas in said exhaust passage upstream of said converter;

outputting a second signal indicative of whether the air-fuel mixture supplied to said engine is lean or rich relative to the predetermined value by sensing the exhaust gas in said exhaust passage downstream of said converter;

feedback controlling an air-fuel ratio of the air-fuel mixture supplied to said engine based on said first signal;

measuring a response delay time from when said first signal changes over, to when said second signal changes over;

calculating a dispersion value of a corresponding value based on said response delay time; and determining that said catalyst has deteriorated when said dispersion value is equal to or less than a predetermined value.

* * * * *